United States Patent Office 2,978,315
Patented Apr. 4, 1961

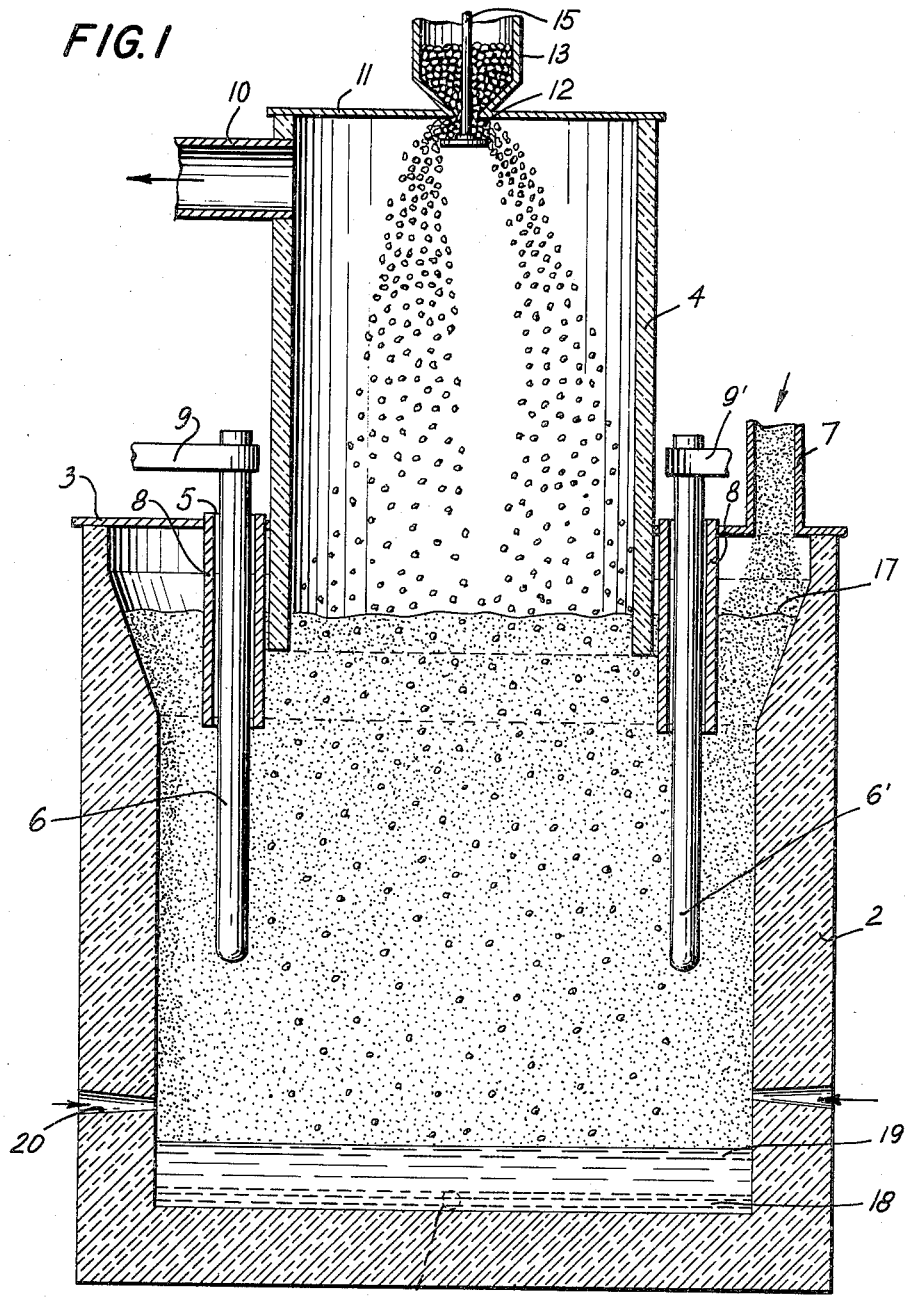

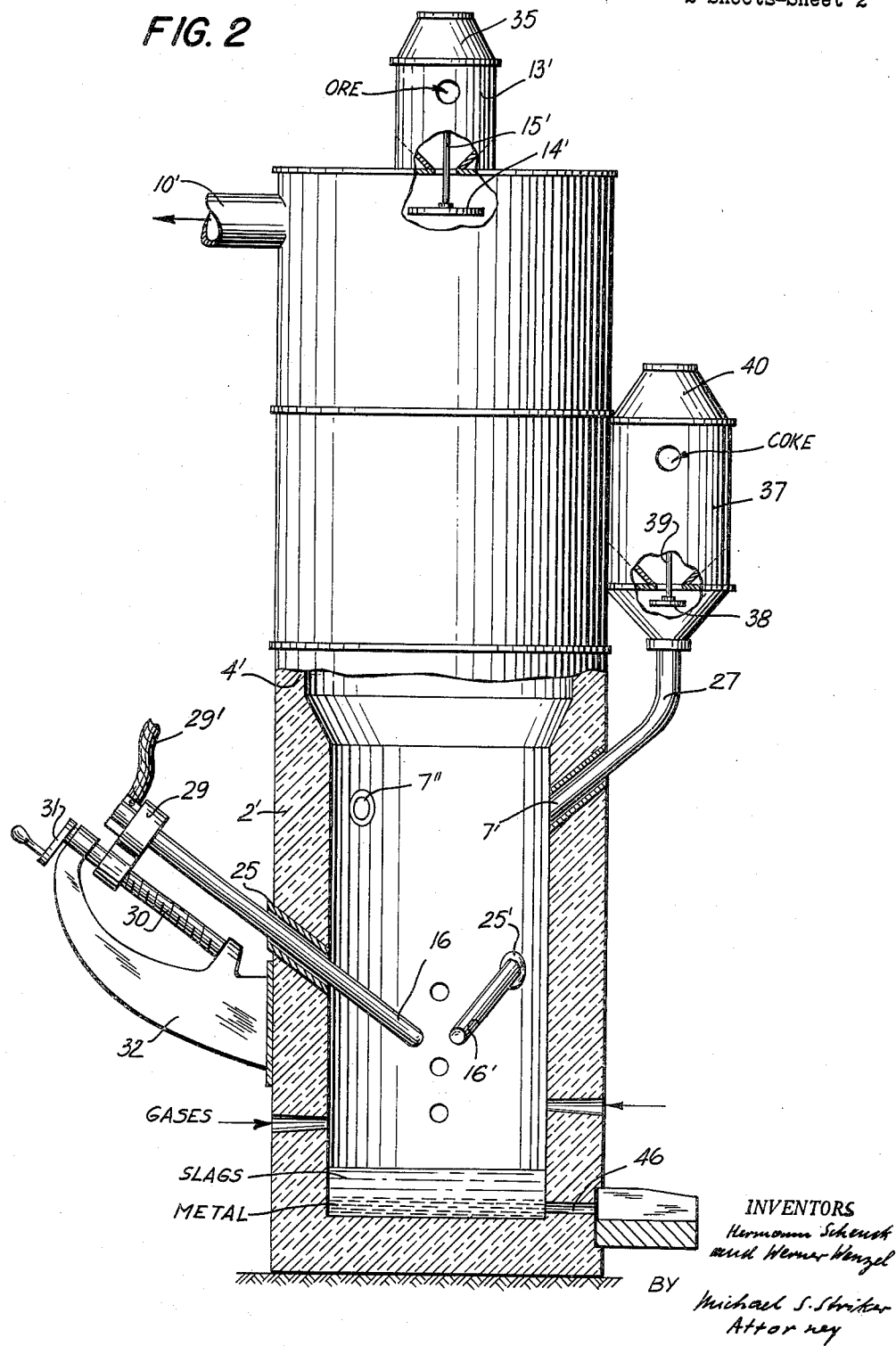

2,978,315

ELECTRICAL HEATING PROCESS AND APPARATUS

Hermann Schenck, Intzestrasse 1, Aachen, Germany, and Werner Wenzel, Bad Godesberg, Germany (Prinz-Heinrich Str. 29, Aachen, Germany)

Filed Apr. 8, 1957, Ser. No. 651,272

Claims priority, application Germany Aug. 31, 1955

13 Claims. (Cl. 75—.5)

This application is a continuation-in-part of application Serial No. 606,780, filed August 28, 1956, now abandoned.

The present invention relates to a process and apparatus for converting electrical energy into heat and for using this heat in processes where heat is required.

There are three different basic known manners of converting electrical energy into heat energy. Such a conversion may be brought about through electrical arcing, by conducting an electrical current through a resistance heater, and by inducing eddy currents in a conductor. However, these known ways of converting electrical energy into heat have the disadvantage of concentrating the heat in a relatively small zone. This action results in localized overheating, and such overheating is in general undesirable for processes carried out by converting electricity into heat. Moreover, the speed with which such processes can be carried out depends upon the speed with which the heat can travel from the warmer to the cooler zones of a given charge.

A further disadvantage of the use of the resistance of an electrical conductor such as a wire for obtaining heat from electricity resides in the fact that such a conductor has a relatively low specific resistance at the required elevated temperature, so that it is only possible to use low voltages and large currents, which are undesirable for many known reasons. Electrical arcs are in general superior to electrical conductors, but they have disadvantages such as an extremely high concentration of heat.

It is a primary object of the present invention to overcome the above disadvantages by providing a process and apparatus capable of distributing heat obtained from electricity in unconcentrated condition over a relatively large region without necessitating the use of low voltages and large currents.

A further object of the present invention is to provide processes and apparatus making use of heat obtained, according to the present invention, from electricity in specific applications such as the reduction of ores.

The present invention makes use of solid resistance bodies which are maintained in suspension by a suitable gas so as to form a fluidized bed. The gas opposes the gravitational pull on the solid bodies to an extent insufficient to raise the bodies substantially but on the other hand sufficient to prevent any substantial falling of the bodies so that in this way the bodies are maintained in suspension in the gas. Thus, the gas can be provided in upwardly direct streams which will maintain the solid bodies in suspension, or without giving any particular direction of movement to the gas the latter can simply be heated so as to provide gas currents which will carry solid bodies.

The fluidized bed is heated with an electrical current by making use of the electrical resistance of the fluidized bed, and electrical current can move directly through the fluidized bed to heat the latter or heat may be obtained by inducing eddy currents in the fluidized bed.

The solid bodies of the fluidized bed move about at a high rate of speed and in all directions within the bed as a result of the influence of the electrical current which may, for example, be a multi-phase alternating current, or as a result of the strong movements of the currents of the gas which carries the particles, and this intense movement of the particles produces a continuous highly efficient transfer of heat throughout the entire bed. On the other hand, the electrical current moves from particle to particle essentially through the free gas space, so that the difference of potential provided between a pair of poles usually connected to a source of alternating current is much greater than if a continuous current path between the poles were provided only by a series of solid bodies in engagement with each other. The potential drop with the fluidized bed lies in general between the potential required for breakdown to produce arcing through a gas and the potential required if a continuous solid conductor connected the poles together. The current can be supplied to the fluidized bed which acts as an electrical resistance in the same way as current is supplied to a liquid which acts as an electrical resistance. For example, current supplying electrodes may be partly submerged in the fluidized bed. Also, the bottom wall of the container of the fluidized bed may serve as an electrode and additional electrodes can be lead into the fluidized bed through one or more of the other walls of the container.

The solid bodies used in the fluidized bed of the present invention are chosen so as to be capable of remaining stable at the temperature at which the fluidized bed is maintained during operation. In other words, at this temperature the solid bodies should not melt or become sintered together. Furthermore, the solid bodies of the fluidized bed should not become changed by the process utilizing the heat obtained in the fluidized bed in such a way that the fluidized bed loses its stability. For relatively low temperatures solid bodies in the form of a metal powder may be used, such as, for example, iron alloys in powder form, particularly alloys of this type which include chrome and nickel. Also, silicon powder may be used. For relatively high temperatures fire-resistant materials are used in powder or granular form. Thus, alumina, magnesia, lime, quartz, etc. or combinations thereof may be used. A carbonaceous powder is particularly suitable for high temperatures and the same is true of a carbonaceous granular material. Also, granulated carbides of sufficiently high melting points may be used.

The current supplying electrodes for the fluidized bed are made of the same material as the bodies of the fluidized bed or of a material which has a good conductivity with respect to the material of the fluidized bed or materials in the fluidized bed but which will not cause at the operating temperature of the fluidized bed any reactions detrimental to the particular process being carried out.

The following examples are given to further illustrate the present invention. The scope of the invention is of course not meant to be limited to the specific details of the examples.

*Example I*

This example relates to the use of an electrically heated fluidized bed for heating a stream of gas. For example, hydrogen gas is to be heated to a temperature of approximately 700° C. In this case use is made of a fluidized bed having solid particles in the form of a powder of iron alloy, and this alloy may include chrome, nickel, manganese, and others. The particles of the fluidized bed are of such a size that they are maintained in suspension by hydrogen gas introduced from below into the fluidized bed and removed from over the fluidized bed. The current supplying electrodes can be made of the same iron alloy as the particles of the fluidized bed. The capability of the electrodes to resist the heat is improved by water cooling the interior of the electrodes.

*Example II*

This example relates to the heating of solid bodies in an electrically heated fluidized bed. For example, copper chips are to be melted by heat obtained from electricity. The solid bodies of the fluidized bed are in this case made of coke powder, and graphite electrodes extend into the fluidized bed. The copper chips are distributed from above into the fluidized bed, and the molten copper is collected on the bottom wall of the container of the fluidized bed. This molten copper is continuously or discontinuously removed through an opening in a wall of the container.

*Example III*

This example relates to a process where the heat obtained from the electricity is sufficient to meet the large energy requirements of an endothermic reaction. As a prototype for a large number of similar reactions, this example relates to the formation of calcium carbide from a carbonaceous material and lime according to the reaction $$CaO + 3C = CaC_2 + CO$$

The use of the process of the invention for carrying through this reaction can, for example, take place in the following way:

A fluidized bed whose solid bodies are in the form of carbonaceous particles having a size ranging between the size of dust particles and small grains is heated by current supplying electrodes extending into the fluidized bed. Particles of lime are introduced into the fluidized carbonaceous bed continuously or discontinuously, for example by causing small grains of lime to flow downwardly into the fluidized bed from above the latter. This lime is converted into calcium carbide according to the above reaction. The molten liquid carbide forms relatively large agglomerates and is not sustained in this form by the gaseous medium of the fluidized bed, so that this molten carbide sinks down and forms a layer of carbide slag which is removed from the reaction container continuously or discontinuously.

*Example IV*

This example also relates to a process having a large endothermic heat requirement. This example relates to the reduction of alumina with carbonaceous material. In this case the fluidized bed has its solid suspended bodies made of suitable grains of alumina. The fluidized bed is used as an electrical resistance by inserting electrodes into the same, and the fluidized bed is in this way electrically heated to a temperature of approximately 1800° C. Suitably granulated carbonaceous material is distributed into the fluidized bed which is heated in the above manner. The carbonaceous material reduces the alumina to metallic aluminum which is converted into aluminum carbide as long as carbonaceous material is present in the fluidized bed. The aluminum carbide furthermore is capable of reacting with the excess alumina to form metallic aluminum. The latter is collected in a molten liquid state on the bottom wall of the container of the fluidized bed, and the molten metal is periodically or continuously removed from the container. The current supplying electrodes are in this case made of sintered corundum surrounding a metallic core made, for example, of copper. The alumina particles of the fluidized bed become conductive enough at high temperatures to consume a sufficient amount of current. The heating of such a fluidized bed of alumina particles is brought about by starting with a fluidized bed of carbonaceous particles and heating this latter bed with graphite electrodes extending into the carbonaceous bed. After the required temperature is reached, the fluidized bed is gradually enriched with alumina particles until the fluidized bed is composed of alumina particles almost in its entirety. Then the current supplied is switched over from the graphite electrodes to corundum electrodes which extend into the fluidized bed and which have in the meantime been heated in the fluidized bed. Instead of corundum electrodes it is possible to use electrodes of a metal having a high melting point, such as, for example, tungsten.

It is in the nature of a fluidized bed of the types referred to above that the gas flowing away from the fluidized bed carries dust with it. This dust is a very fine dust formed by the continuous rubbing together of the solid bodies which form the fluidized bed. This dust can also come from materials introduced into the fluidized bed and heated or brought to a reaction therein. It is desirable in many cases to separate the dust from the gas and to lead the dust back to the fluidized bed. For the purpose of reintroducing this dust into the fluidized bed it may in some cases be desirable to process the dust so as to give it a desirable larger granulation, for example, by briquetting, sintering, pelleting, etc.

In the case of Example III above, the carbon monoxide gas leaving the fluidized bed contains fine dust particles of lime and carbon. In this case it is desirable to first cool the dust containing gas, for example in a waste-heat boiler, and then to separate the dust from the gas, for example with an electrical gas cleaning device. The dust which is obtained in this way is moistened and formed into crumbs by rolling. These crumbs, under some circumstances after hardening thereof, are redistributed to the fluidized bed.

It is within the purview of the present invention to carry out any of the above described processes at different pressure levels. It is of advantage, for example, to carry out some of the above described processes at a pressure less than atmospheric pressure. Thus, the reaction between alumina and aluminum carbide according to Example IV may be carried out at less than atmospheric pressure. With other processes it may be desirable to maintain the fluidized bed at more than atmospheric pressure, for example, in order to maintain the loss of dust from the fluidized bed at a minimum.

The process of the present invention is particularly suitable for the reduction of iron ore. In order to bring about the reduction of iron ore according to the present invention, the fluidized bed is composed of carbonaceous particles ranging in size from dust to relatively small grains. Iron ore particles in a similar range of sizes is distributed through the fluidized bed, and this mixture of carbonaceous particles and iron ore particles has an excess of carbon and is electrically heated directly by electrodes extending into the fluidized bed, the reaction products in solid or liquid form settling beneath the fluidized bed as a result of their greater specific weight so as to be separated from the excess carbon.

The fluidized bed of reducing carbonaceous material is provided in a container of several meters diameter and the bed itself is several meters deep. The current supplying electrodes made of graphite or burnt carbon extends into the fluidized bed adjacent its periphery, and three electrodes may be used and may be arranged at the corners of a triangle. The current passes from the electrodes through the fluidized bed in which the carbonaceous particles are in suspension. These particles are maintained in suspension by carbon monoxide gas rising upwardly through the reducing bed. The potential applied to the electrodes in order to heat the fluidized bed will vary according to the fineness and density of the bed and is on the order of several thousand volts. The voltage can be regulated according to the degree of fineness of the combustible material used.

In order to carry out the reducing process the particulate iron ore is distributed from above into the highly heated carbonaceous particles. The distribution of the iron ore is carried out in such a way that each particle of ore is independently surrounded by an excess of carbon so that the formation of compact portions of iron ore in the fluidized carbon bed is avoided. As a result of their weight the ore particles sink downwardly through the fluidized bed and collect together on the bottom wall of the container of the fluidized bed beneath the latter. As they pass downwardly through the fluidized bed the ore particles are reduced partly by the reducing gas and partly by direct contact with the carbonaceous particles. The factors which control the reduction speed and the period of time during which the ore particles remain in the fluidized bed are so regulated that the ore is essentially fully reduced after falling through the fluidized bed.

The following factors are regulated in order to control the reducing process:

(1) The temperature of the fluidized carbonaceous bed is regulated by the voltage applied to the electrodes;
(2) The bed is maintained at a predetermined depth;
(3) The size of the carbonaceous particles is carefully chosen;
(4) The size of the ore particles is carefully chosen; and
(5) The movement of the fluidized bed is regulated.

It is possible to work in an electrically heated fluidized carbonaceous bed either above or below the melting point of the ore. Also, the ore can first move through a temperature range below its melting point and then through a temperature range above its melting point. Usually the conditions are such that the reaction product is removed from the reducing apparatus in a molten liquid state. Thus, a metal bath such as a bath of molten iron forms on the bottom wall of the reducing container, and a liquid layer of slag rests on this bath, the slag being composed of the molten ore gangue, the molten carbon ash, and under certain circumstances of unreduced ore such as iron oxide.

The layer of slag is used for further regulation of the electrical reducing process. At very high temperatures of the fluidized carbonaceous bed a thorough reduction and carburizing of the ore particles, such as iron ore particles, take place. According to the manner in which the process is carried out and according to the composition of the aggregate a reduction of silica, etc., takes place. If a predetermined proportion of larger ore pieces are distributed in the fluidized bed, then these larger pieces reach the slag in unreduced condition and enrich the slag with ore, such as iron oxide. In this way it is possible to provide a regulated oxidizing action through the slag on the metal droplets passing therethrough.

It is also possible to add relatively large carbonaceous pieces to the carbonaceous particles of the fluidized bed in a controlled manner so that these larger pieces come to rest upon the slag, and in this way the slag droplets moving downwardly out of the fluidized bed must pass through a layer of solid carbonaceous bodies so as to be fully reduced thereby. Thus, with a reducing process and apparatus of the above type a variety of regulating controls are possible for the complete reduction of an ore such as iron ore as well as for the production of a predetermined reaction product.

In order to provide a low consumption of carbonaceous material with the above described electrical reducing process, measures are taken according to the present invention to enrich the gases leaving the reducing apparatus with carbon dioxide. In particular, the carbon monoxide is eliminated according to the reaction $$2CO = CO_2 + C$$

Because of the dependence of this reaction on pressure, it is of advantage to carry out the electrical reducing process of the invention at an elevated pressure of, for example, over 2 atmospheres.

There are two possible ways of introducing the carbonaceous particles into the reducing apparatus. The carbonaceous particles can be allowed to fall into the fluidized bed together with the ore particles, but the result will be an excess by weight of ore since for 4 parts by weight of ore there will in general be approximately one part by weight of coke. Thus, sintering of the ore and non-uniform distribution thereof may result. It is therefore preferred to introduce the ore and the combustible material separately from each other into the reducing bed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly diagrammatic vertical sectional view of a reducing apparatus according to the present invention; and Fig. 2 is a partly sectional elevational view of another embodiment of a reducing apparatus according to the present invention.

Referring to Fig. 1 it will be seen that the reducing apparatus includes a lower container 1 provided as is shown diagrammatically with a fire-resistant layer 2 at its inner surface. The container 1 is closed in a fluid-tight manner by the cover 3. A cylinder 4 covered with a ceramic layer is carried by the cover 3 and passes centrally through the same into the lower container 1. The cover 3 is provided beyond the cylinder 4 with openings 5 through which electrodes 6 respectively extend into the container 1, and one or more openings 7 are provided in the cover 3 for leading carbonaceous particles into the container 1. The electrodes 6 pass through sleeves 8 which are preferably cooled and which are of an electrically non-conductive material at least at their lower portions engaging and next to the fluidized bed. The manner in which the electrodes are introduced into the interior of the container 1 is of particular importance. The electrodes are made of carbon or graphite and are introduced from above into the fluidized bed. The sleeves 8 are preferably cooled and made of a non-conductive material. For example these sleeves are in the form of quartz tubes having hollow walls through which cooling water flows. By the use of such sleeves it is possible to provide electrical current in predetermined horizontal layers extending through the fluidized carbonaceous bed, and thus a predetermined favorable temperature distribution is provided in the fluidized bed. The lower ends of the electrodes must be sufficiently above the upper surface of the layer of slag to guarantee that the current for the most part passes directly through the fluidized carbonaceous bed. Only in this way can a high voltage be maintained between the electrode with a large power input to the apparatus. Otherwise the electrical current flows through the layer of slag where it encounters only a small electrical resistance. A suitable adjusting means is provided for adjusting the distance of the electrodes above the slag, and in this way the amount of current which flows through the slag can be regulated and thus the temperature of the slag can be controlled. The burning off of the electrodes is maintained at a minimum. This latter result is provided by causing the ore particles to pass downwardly through the bed at an intermediate zone thereof between the electrodes so that the latter are not engaged by the ore.

Conductors 9 interconnect the electrodes with a suitable source of current.

The cylinder 4 communicates at its upper end with a gas discharge conduit 10.

A means for supplying the ore is carried by the cover 11 of the cylinder 4, this cover closing the top end of the cylinder 4. This means is arranged centrally of the cover 11 and is in the form of a hopper 13 having a bottom discharge outlet 12. A shaft 15 passes through the outlet 12 downwardly beyond the latter and is fixed at its bottom end to a distributing plate 14 having a top face directed upwardly toward the outlet 12, so that ore particles in the hopper 13 will fall onto the plate 14. The shaft 15 is driven at a speed which varies according to a predetermined cycle as by driving the shaft with a variable speed motor whose speed is varied automatically according to a predetermined cycle which repeats itself.

Thus, when the disc 14 rotates at its greatest speed the ore particles will be thrown outwardly toward the inner surface of the cylinder 4, while when the disc 14 rotates at its lowest speed the particles will simply fall from the edge of the disc 14 even along a path extending beneath the latter. Thus, the falling ore particles will be uniformly distributed across the interior of the cylinder 4. By arranging the electrodes 6 outwardly beyond the cylinder 4 the particles of ore moving downwardly from the latter will not engage electrodes.

Above its bottom wall the container 1 is formed with a tap hole 16 for the liquid products.

The small particles of carbonaceous material are introduced separately from the iron ore particles through the opening 7 into the container 1 in such a way that a substantially constant upper lever 17 of the fluidized bed is maintained. A potential difference is maintained across the electrodes 6 so that a flow of current essentially transversely through the fluidized bed results and the temperature of the fluidized bed can be regulated by the voltage. The ore particles are uniformly distributed over the fluidized bed and contact between the ore particles is effectively prevented by the cyclical variation in the rotating speed of the distributing plate 14 which guarantees that all of the ore particles are sufficiently spaced from each other to prevent contacting each other and moreover are uniformly distributed over the fluidized bed.

The ore particles sink downwardly through the fluidized bed and their downward speed of movement depends upon the size of the ore particles as well as the size of the carbonaceous particles. The ore floating downwardly through the fluidized bed is first heated, then reduced by the upwardly moving gases, and finally melted. By maintaining a proper depth of the fluidized bed, a controlled speed of movement of the ore in the bed resulting from the sizes of the particles, and a properly regulated temperature controlled by the voltage applied to the electrodes, there is obtained on the floor of the container 1 an ore which has been reduced to the desired degree. The liquid obtained in this way and under some circumstances a relatively highly carburized metal such as iron collects at the bottom of the container 1 to form the liquid iron layer 18, and a slag layer 19 forms above the iron layer 18. The iron and slag can be removed through the tap hole 16 continuously or discontinuously.

The container 1 has a gas inlet means shown diagrammatically in the form of the lower openings 20 which lead into a lower part of the fluidized carbonaceous bed. Gas under pressure is introduced through these openings 20 and blown into the fluidized bed to maintain the carbonaceous particles in suspension and to produce a desirable turbulence in the fluidized bed. Gas as suitable for this purpose as any other is the exhaust gas of the apparatus which leads the latter to the conduit 10. Moreover, reducing gases such as natural gas or the like may be blown in through the openings 20, and oils may be also blown in through these openings either separately or together with a reducing gas. Furthermore, it is possible to introduce the small carbonaceous particles of the fluidized bed into the apparatus by blowing them either entirely or partly through the inlet openings 20.

The gas or cracking products introduced through the opening 20 contribute to the reducing reaction and correspondingly reduce the amount of solid carbonaceous particles which must be supplied.

It is possible to control the speed of movement of the ore particles such as iron ore particles in a vertical direction through the fluidized bed by a mechanical means in such a way that, for example, a regulated vibration of the individual ore particles is produced. Such vibrations can be provided in a known way by the use of sonic or ultrasonic waves.

In the embodiment of the invention which is shown in Fig. 2 the upper container 4' forms an extension of the lower container 2' and carries at its top end the supply means for the ore. Thus, there is shown in Fig. 2 the hopper 13' together with the shaft 15' and the distributing disc 14', a suitable motor 35 being connected to the shaft 15' to rotate the latter cyclically in the manner described above. The conduit 10' communicates with the upper end of the container 4' for leading away the gases. Three tubular members 27 are equidistantly distributed about the axis of the container 2' for feeding carbonaceous particles thereto, and these tubes extend respectively through water cooled shelves, two of these sleeves 7' and 7" being shown in Fig. 2. Each tube 27 communicates with the bottom end of a hopper 37 for the carbonaceous particles, this hopper carrying a motor 40 which drives a shaft 39 etxending downwardly through the discharge opening of the hopper and fixed at its bottom end to a distributing disc 38. Three electrodes 16 are equidistantly distributed about the axis of the container 2', and two of theess electrodes are shown in Fig. 2 extending angularly into the container respectively through water cooled sleeves 25 and 25'. The extent to which the electrodes are spaced from each other is controlled by an adjusting means connected to each electrode and controlled by a handle 31. This handle is fixed to a screw 30 turnably carried by a support 32 and extending threadedly through a nut 29 fixed to each electrode. Conductors 29' respectively connect the electrodes with a suitable source of alternating current. The gases are introduced through the openings arranged along a vertical line extending between the electrodes 16 and 16' shown in Fig. 2 as well as through the lateral openings shown in Fig. 2 just above the layer of slag which rests on the layer of metal, and the container 2' is provided with a tap hole 46.

Good results have been obtained using German Ruhr anthracite of one millimeter and smaller sizes and German red iron ore of one half millimeter and smaller sizes and with three phase current providing a drop of 25 volts for each 10 millimeters of distance of the electrodes from each other and providing 2500 volts between electrodes having a distance of 1000 millimeters from each other.

It will be understood that each of the elements described above, or two or more together, may also find a useful application in other types of heating apparatus differing from the types described above.

While the invention has been illustrated and described as embodied in reducing apparatus, it is not intended to be limited to the details shown, since various modifications and structural changes may be made without departing in any way from the spirit of the present invention.

When the apparatus of Fig. 1 is used for melting copper chips according to Example II above, the coke powder is introduced through the opening 7 while the copper chips are introduced by the supply means 13 to be distributed through the fluidized bed, the molten liquid copper collecting together in a layer 19 at the bottom of the apparatus.

An important advantage of the invention is that a high tension of several thousand volts can be applied in this electrical heating process and apparatus, whereas, for instance, in the case of conventional arc furnaces, the furnace electrodes either form open arcs or dip into a charge at rest. In these cases, the induction losses are considerably higher as a result of the used low voltages and high amperages.

In principle it is to be further mentioned that the effecting of the fluidized state of the bed does not depend on the introduction of a fluidizing gas from the outside into the container. The heating up of the gas contained or produced in the container, and/or the electrical charging of the solid resistance bodies, may be sufficient.

Without further analysis, the foregoing will so fully reveal the gist of the present invention that others can by applying current knowledge readily adapt it for various application without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for electrically melting ores, the steps of conducting an electrical current without breakdown through at least a portion of a fluidized bed of carbonaceous bodies, so as to heat the fluidized bed to a predetermined reaction temperature; and distributing ore bodies through said heated bed to be reduced by said carbonaceous bodies at said temperature of said bed and melted therein.

2. In a process for electrically melting ores, the steps of conducting an electrical current through at least a portion of a fluidized bed of carbonaceous bodies along a path too long and at a potential having with respect to the cross sectional area of said portion of said bed a value too small to produce arcing, so as to heat the fluidized bed to a predetermined reaction temperature; distributing ore bodies through said heated bed to be reduced by said carbonaceous bodies at said temperature of said bed and melted therein; and adding to said bed carbonaceous bodies to replace those consumed in the reduction process.

3. In a process for electrically melting ores, the steps of conducting an electrical current without breakdown through at least a portion of a fluidized bed of carbonaceous bodies, so as to heat the fluidized bed to a predetermined reaction temperature; distributing ore bodies through said heated bed to be reduced by said carbonaceous bodies at said temperature of said bed and melted therein; and blowing a reduction medium into a lower portion of said bed together with a gas which maintains the carbonaceous bodies of said bed in suspension.

4. A process for electrically melting ores, comprising the steps of conducting an electrical current without breakdown through at least a portion of a fluidized bed of carbonaceous bodies, so as to heat the fluidized bed to a predetermined reaction temperature; distributing ore bodies through said heated bed to be reduced by said carbonaceous bodies at said temperature of said bed and melted therein; and removing the non-gaseous reduction products from beneath the fluidized bed.

5. In a process for electrically melting ores, the steps of conducting an electrical current without breakdown through at least a portion of a fluidized bed of carbonaceous bodies, so as to heat the fluidized bed to a predetermined reaction temperature; distributing ore bodies having a size within a predetermined range through said heated bed to be reduced by said carbonaceous bodies at said temperature of said bed and melted therein; and distributing a predetermined proportion of additional ore bodies having a size larger than said predetermined range of sizes through said bed, said additional ore bodies moving through said bed and reaching in substantially unreduced condition a slag beneath said bed.

6. In a process for electrically melting ores, the steps of conducting an electrical current without breakdown through at least a portion of a fluidized bed of carbonaceous bodies having a size within a predetermined range of sizes, so as to heat the fluidized bed to a predetermined reaction temperature; distributing ore bodies through said heated bed to be reduced by said carboneaceous bodies at said temperature of said bed and melted therein; and distributing a predetermined proportion of additional carbonaceous bodies having a size larger than said predetermined range of sizes through said bed, said additional carbonaceous bodies forming beneath the fluidized bed a solid bed of carbonaceous bodies.

7. In a process for electrically melting ores, the steps of conducting an electrical current through at least a portion of a fluidized bed of carbonaceous bodies along a path too long and at a potential having with respect to the cross sectional area of said portion of said bed a value too small to produce arcing, so as to heat the fluidized bed to a predetermined reaction temperature; distributing ore bodies through said heated bed to be reduced by said carbonaceous bodies at said temperature of said bed and melted therein; and maintaining the fluidized bed at a pressure greater than atmospheric pressure.

8. In a process for reacting two materials, the steps of passing a gas in an upward direction through a bed of solid comminuted particles of a first reactive material capable of conducting electric current so as to cause relative movement of said particles; passing an electric current through said particles while in movement for heating said particles to a predetermined reaction temperature; and adding comminuted solid particles of a second reactive material to said particles of said first material for reaction therewith at said predetermined reaction temperature.

9. In a process for reacting a reducible material with a reducing agent, the steps of passing a gas in an upward direction through a bed of solid comminuted particles of a reducing agent capable of conducting electric current so as to cause relative movement of said particles; passing an electric current through said particles while in movement for heating said particles to a predetermined reaction temperature; and adding comminuted solid particles of a reducible material to said particles of said reducing agent for reaction therewith at said predetermined reaction temperature.

10. In a process for reacting a reducible ore with a carbonaceous reducing agent, the steps of passing a gas in an upward direction through a bed of solid comminuted particles of a carbonaceous reducing agent capable of conducting electric current so as to cause relative movement of said particles; passing an electric current through said particles while in movement for heating said particles to a predetermined reaction temperature; and adding comminuted solid particles of a reducible ore to said particles of said carbonaceous reducing agent for reaction therewith at said predetermined reaction temperature.

11. In an ore reduction process of the type described, the steps of forming a fluidized bed of solid particles of a carbonaceous reducing agent capable of conducting electric current and adapted to reduce an ore at elevated temperature; introducing from above into said fluidized bed finely subdivided particles of said ore in such small quantity relative to the quantity of said particles of carbonaceous material that each ore particle is substantially surrounded by particles of carbonaceous material and thus maintained substantially separated from other ore particles by the surrounding particles of carbonaceous material; passing electric current through a substantially horizontal layer of said fluidized bed so as to resistance heat the same and cause reaction between said ore particles and said surrounding particles of carbonaceous material so as to reduce said ore particles and form molten particles of reduced ore sinking downwardly in said fluidized bed; and collecting the reduced ore formed by said downwardly sinking molten reduced ore particles at the bottom of said fluidized bed.

12. In an ore process of reducing iron ore, the steps of forming a fluidized bed of solid particles of a carbonaceous reducing agent capable of conducting electric current and adapted to reduce iron ore at elevated temperature; introducing from above into said fluidized bed finely subdivided particles of said iron ore in such small quantity relative to the quantity of said particles of carbonaceous material that each iron ore particle is substantially surrounded by particles of carbonaceous material and thus maintained substantially separated from other iron ore particles by the surrounding particles of carbonaceous material; passing electric current through the particles of said fluidized bed so as to resistance heat the same and cause reaction between said iron ore particles and said surrounding particles of carbonaceous material so as to reduce said iron ore particles and form molten particles of reduced iron ore sinking downwardly in said fluidized bed and to form simultaneously carbon monoxide maintaining said fluidized bed in fluidized state; and collecting the reduced iron ore formed by said downwardly sinking molten reduced iron ore particles at the bottom of said fluidized bed.

13. A process for reacting a reducible material with a reducing agent, as defined in claim 9, wherein said reducing agent is a carbonaceous reducing agent capable of conducting electric current and adapted to reduce calcium oxide at elevated temperature under formation of calcium carbide; and wherein said comminuted solid particles of a reducible material consist essentially of calcium oxide.

References Cited in the file of this patent

UNITED STATES PATENTS

| | | |
|---|---|---|
| 1,443,444 | Thornhill | Jan. 30, 1923 |
| 1,847,527 | Greene | Mar. 1, 1932 |
| 1,857,799 | Winkler | May 10, 1932 |
| 2,194,454 | Greenawalt | Mar. 19, 1940 |
| 2,242,219 | Bailey | May 20, 1940 |
| 2,398,443 | Munday | Apr. 16, 1946 |
| 2,627,457 | Kerley | Feb. 3, 1953 |
| 2,799,640 | Pevere et al. | July 16, 1957 |